Patented Mar. 8, 1949

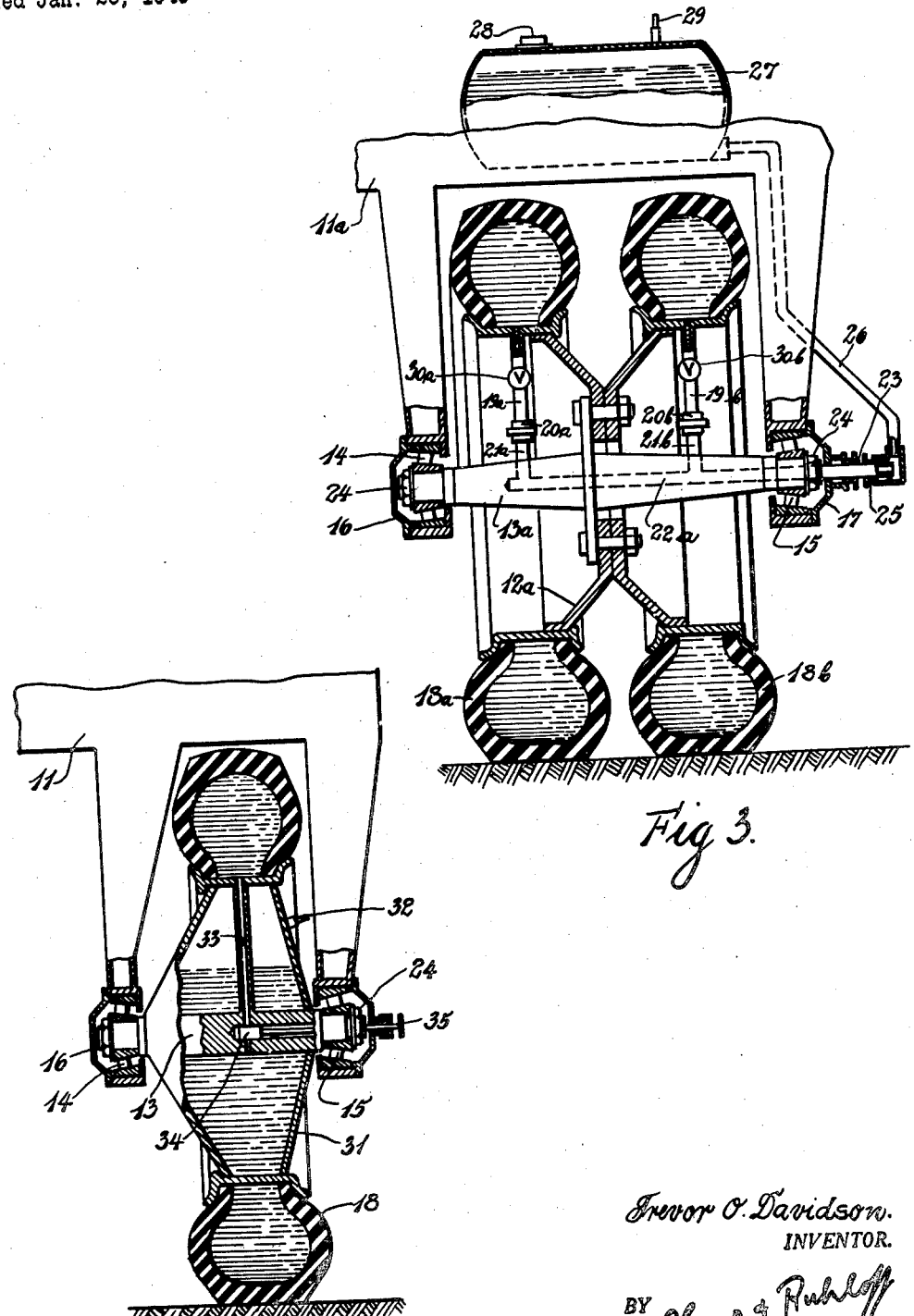

2,463,522

UNITED STATES PATENT OFFICE 2,463,522

PNEUMATIC TIRE

Trevor O. Davidson, South Milwaukee, Wis., assignor to Bucyrus-Erie Company, South Milwaukee, Wis., a corporation of Delaware Application January 26, 1945, Serial No. 574,667

11 Claims. (Cl. 152—416)

My invention relates to new and useful improvements in pneumatic tires for automotive vehicles, more particularly the automotive mounting for cranes, power-shovels and the like.

Although at present the most usual practice is to mount such machines on creeping traction, yet the demands for protection of the surface of highways, and for high speed movement, would render pneumatic tires desirable, were it not for one consideration, namely that pneumatic tires do not offer a firm enough foundation for the machine when it is in operation, at which time solid rubber tires would be preferable.

In other words, what would be ideal would be a machine, resiliently mounted during propulsion, and solidly mounted during operation.

Jacking the machine while in operation is not a solution, for this would interfere with minor moves during operation.

Waterfilled tires are somewhat the equivalent of solid tires. So, of course, one could fill the tires full of water for operation, and then let out the water and refill the tires with air for moving. But this, although accomplishing the desired end, would require an excessive amount of time.

A tire partly filled with water, and partly with air, would be a mere makeshift comprise, rather than a solution. In fact, if the tire contains an appreciable amount of air, it will act practically as though 100% pneumatic.

Accordingly it is the principal object of my invention to devise a vehicle support in which a water-filled tire shall have the characteristics of an air-filled tire during propulsion, and the characteristics of a solid tire during operation.

When herein I refer to the "air-head" in the tank, I mean a space effectively above the level of the liquid in the tank, this space being sealed except from the liquid, and containing air or other gas under pressure. This pressure ought preferably, but not necessarily, be induced pressure in excess of that caused merely by the weight of the vehicle on the water-filled tire.

Another object of my invention is to devise such a vehicle support involving a double-tired wheel, where it would have the further advantage of equalizing the pressure between the two tires of the wheel.

In addition to my principal object, above stated, I have worked out a number of novel and useful details, which will be readily evident as the description progresses.

My invention consists in the novel parts and in the combination and arrangement thereof, which are defined in the appended claims, and of which four embodiments are exemplified in the accompanying drawings, which are hereinafter particularly described and explained.

Throughout the description the same reference number is applied to the same member or to similar members.

Figure 3 is the same as Figure 2, but showing a further improvement.

Figure 4 is a vertical transverse section of a single tire and associated parts, embodying a fourth variant of my invention.

Figures 1, 2:
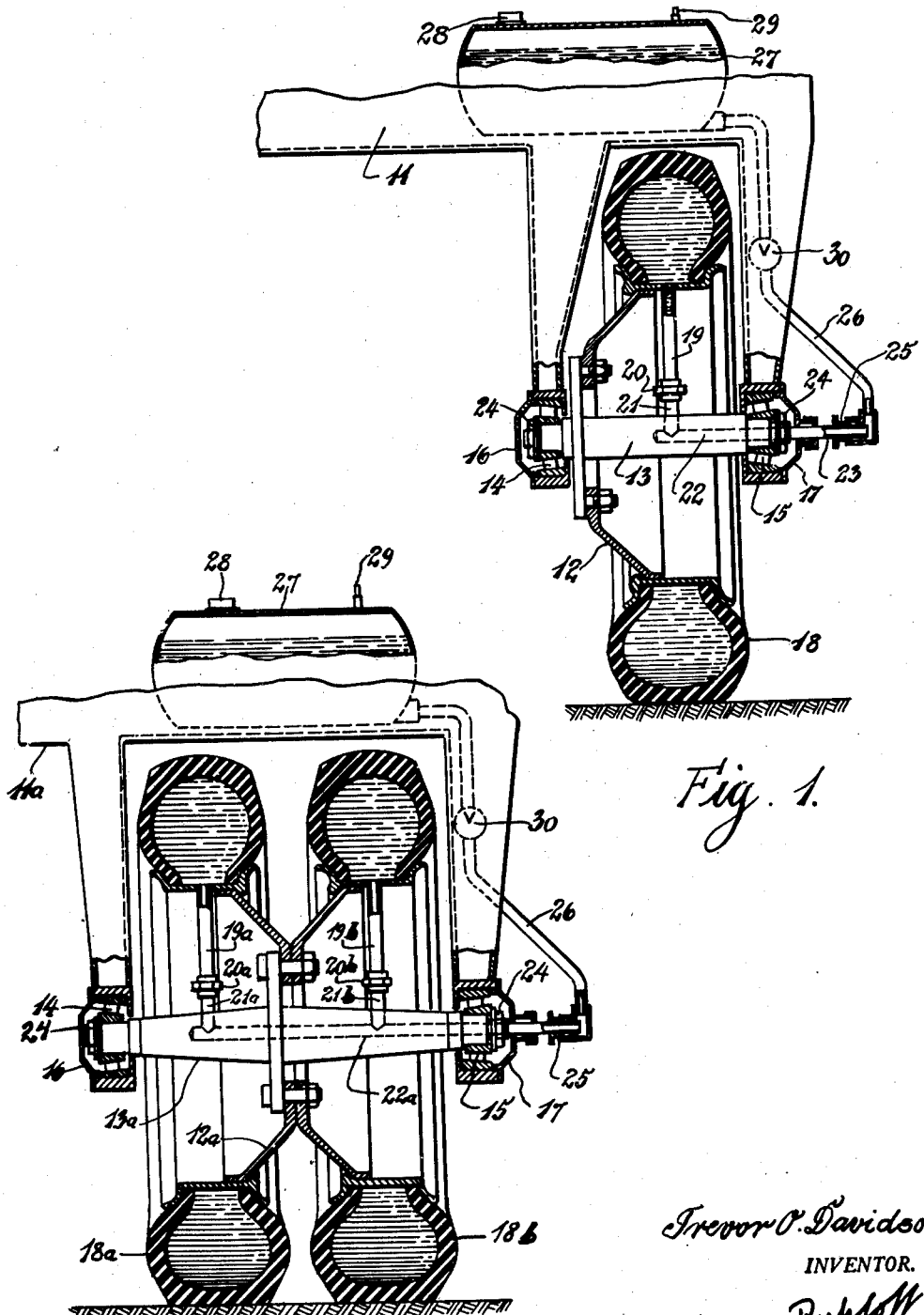
Figure 1 is a vertical transverse section of a single tire and associated parts, embodying one variant of my invention.
Figure 2 is a vertical transverse section of a double tire and associated parts, embodying a second variant of my invention.

Turning to Figure 1, we see that 11 is that portion of the vehicle directly supported by wheel 12, whose axle 13 turns in bearings 14 and 15, housed in boxes 16 and 17 respectively. The axle could, of course, be fixed, with the wheel journaled thereon.

Tire 18 may be of the ordinary pneumatic type, comprising an outer shoe and an inner tube (not differentiated in my drawings); but having, in place of the conventional valve for the introduction of air, a rather larger pipe 19. This pipe, when the tire 18 is in place upon the rim of the wheel 12, can be connected to pipe 21 by coupling 20. Pipe 19 might be the conventional valve of a pneumatic tire; but, if so the valve mechanism would have to be removed therefrom, to permit free reciprocation of liquid therethrough. Preferably pipe 19 should be larger than a conventional tire-valve. Herein, whenever I refer to the valve of a tire, I do not intend to be limited to a conventional valve, but rather intend to include within the scope of my claims the larger pipe (without valve mechanism) contemplated in my drawings and description.

Pipe 21, in turn leads to a lengthwise passage 22 within axle 13, which passage leads out at one end as pipe 23.

Nuts 24 serve to hold bearings 14 and 15 on the two ends of the axle.

Pipe 23, in turn, is attached to pipe 26 by a water-tight swivel joint 25. Pipe 26, in turn, is connected to the bottom of tank 27.

This tank and thereby the tire 18 can be filled with water through a hole closed by cap 28, and this water can then be placed under pressure by compressed air pumped in through conventional tire-valve 29 in the top of the tank. Or preferably the hole closed by cap 28 could be eliminated or kept closed, and the system could first be exhausted of air through valve 29, and then first water and then air could be pumped into the system through said valve.

Of course, some other liquid than water could be used without departing from the spirit of my invention.

A shut-off valve 30, of any convenient sort, serves selectively to open pipe 26 to the free passage of water, or to close it tightly. This valve can be opened and closed either locally by a handle, or (in any conventional manner) by remote control from the operator's seat on the machine.

Tank 27, as shown, is for convenience elevated completely above the tire which it serves, but this positioning is not essential. All that is necessary is that pipe 26 enter the tank below the water-level therein, so as to keep air from entering the tire through passage 22, or that some other expedient be provided for this purpose.

Turning now to Figure 2, we see that the device there disclosed is identical to that of Figure 1, except that now we have: a somewhat differently shaped frame 11a, in place of frame 11; a double wheel 12a, in place of wheel 12; a longer axle 13a, in place of axle 13; two tires 18a and 18b, in place of tire 18; two pipes 19a and 19b, in place of pipe 19; two couplings 20a and 20b, in place of coupling 20; two pipes 21a and 21b, in place of pipe 21; and a longer passage 22a, in place of passage 22.

Reverting now to Figure 1, we see that the operation of my device is as follows.

When the machine, supported by wheels of my design, is moving over the roads, valve 30 is left open. The intermittent compressions to which the bottom of the tire 18 is subjected, are in part taken up by the resiliency of the walls of the tire, but principally by the compression of the air-head in tank 27. Thus we have substantially a pneumatic tire.

But, when the machine is working, valve 30 is shut, thereby cutting off the resiliency of the air-head in tank 27, and giving us substantially a solid tire.

The device of Figure 2 operates in identically the same way as the device of Figure 1, with the following additional function. Due to the hydraulic interconnection between the two tires 18a and 18b, through passage 22a, the pressure in the two tires is at all times equalized.

The device of Figure 3 operates in identically the same way as the device of Figure 2, with the following additional function. In place of valve 30 in pipe 26, the present variant has two valves 30a and 30b in pipes 19a and 19b respectively. When these two valves are opened, we have the resiliency which is common to the variants of Figures 1 and 2, plus the equalization of Figure 2. But when the two valves are closed, we no longer have equalization; thus the machine of Figure 3 has a wider stability base during operation than does the machine of Figure 2. Although this variant is shown with a branched conduit, independent conduits could be run from each tire to the tank.

The device of Figure 4 differs from the device of Figure 1, through utilizing the hollow wheel itself as the tank.

In this variant, the wheel 31 constitutes a tank, as just stated, to which can be admitted first water then air under pressure, through valve 32.

A conduit 33 passes from this wheel-tank 31, through axle 13, to the interior of the tire 18, and is closeable by a valve 34 within the axle 13, this valve being actuable by handle 35 in any convenient manner.

Except for the features just described, this variant operates exactly like the variant of Figure 1.

Having now described and illustrated four forms of my invention, I wish it to be understood that my invention is not to be limited to the specific forms or arrangements of parts herein described and shown.

I claim:

1. Means for supporting a vehicle, comprising: a vehicle-supporting wheel; a resilient hollow liquid-containing tire, mounted thereon; a liquid-containing tank, having an air-head; a conduit, permanently leading from the tank beneath the liquid level therein to the interior of the tire; and means for closing this conduit.

2. A subcombination of means for supporting a vehicle, comprising: a vehicle-supporting wheel, having a rim including tire-securing portions for the mounting of a resilient hollow-liquid containing tire; a liquid-containing tank, having an air-head; a conduit, permanently leading from the tank beneath the liquid level therein to and through the rim intermediate the tire-securing portions thereof; and means for closing this conduit.

3. Means, according to claim 2, further characterized by the fact that the conduit passes from the rim to the axle of the wheel, thence lengthwise through the axle and out one end thereof, thence through a swivel joint, and thence to the tank.

4. Means according to claim 2, further characterized by the fact that the tank is formed within the main body of the wheel.

5. Means, according to claim 2, further characterized by the fact that the tank is formed within the main body of the wheel, and that the conduit passes from the rim to and through the axle of the wheel, and thence to the tank, and that the means for closing the conduit is a valve within the axle actuable from outside the wheel.

6. Means, according to claim 2, further characterized by the fact that the conduit passes from the rim to the axis of the wheel, thence through a swivel joint at said axis, and thence to the tank.

7. A subcombination means for supporting a vehicle, comprising: a vehicle-supporting wheel, having rims including tire-securing portions for the mounting of twin resilient hollow liquid-containing tires; a liquid-containing tank, having an air-head; a conduit permanently leading from the tank beneath the liquid level therein, and branching, one branch leading to and through one rim intermediate the tire-securing portions thereof, and the other branch leading to and through the other rim intermediate the tire-securing portions thereof; and means for closing this conduit.

8. Means, according to claim 6, characterized by the fact that the conduit passes from each rim to the axle of the wheel, then lengthwise through the axle and out one end thereof, thence through a swivel joint, and thence to the tank.

9. Means, according to claim 6, characterized by the fact that the means for closing the conduit consists of two elements, one located in each branch of said conduit.

10. A subcombination of means for supporting a vehicle, comprising: a vehicle-supporting wheel having rims including tire-securing portions for the mounting of twin resilient hollow liquid-containing tires; a liquid-containing tank, having an air-head; conduits, each permanently leading from the tank beneath the liquid level therein to and through a rim intermediate the tire-securing portions thereof; and means for closing these conduits.

11. Means, according to claim 10, characterized by the fact that each conduit passes from a rim to the axis of the wheel, thence through a swivel joint at said axis, and thence to the tank.

TREVOR O. DAVIDSON.

REFERENCES CITED

The following references are of record in the file of this patent:

UNITED STATES PATENTS

| Number | Name | Date |
|---|---|---|
| 604,006 | Duensing | May 10, 1898 |
| 770,531 | Mercader | Sept. 20, 1904 |
| 1,049,677 | Craig | Jan. 7, 1913 |
| 1,246,443 | Lofland | Nov. 13, 1917 |
| 1,404,754 | Gammeter | Jan. 31, 1922 |
| 1,807,167 | Nelson | May 26, 1931 |
| 2,168,690 | Uksilla | Aug. 8, 1939 |

FOREIGN PATENTS

| Number | Country | Date |
|---|---|---|
| 344,109 | Great Britain | 1931 |
| 345,150 | France | 1904 |
| 359,443 | France | 1906 |